July 6, 1965　　　H. O. FRIEDRICH　　　3,193,031
WEIGHING SCALE
Filed Feb. 20, 1963　　　　　　　　　　　　2 Sheets-Sheet 1

Inventor
Harold O. Friedrich
By Stone, Nierman, Burmeister & Zummer
Attys.

July 6, 1965   H. O. FRIEDRICH   3,193,031
WEIGHING SCALE
Filed Feb. 20, 1963   2 Sheets-Sheet 2
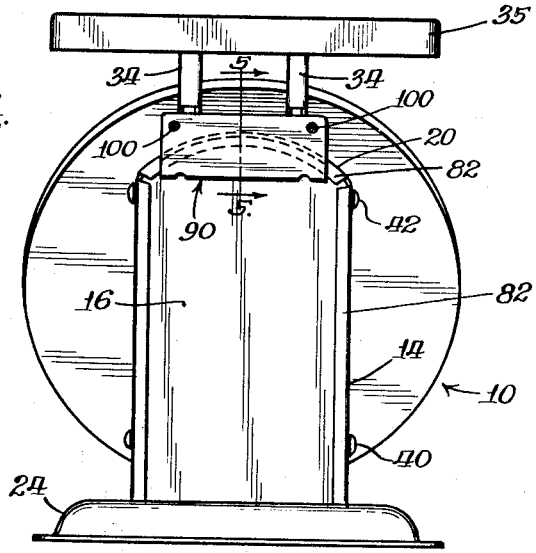
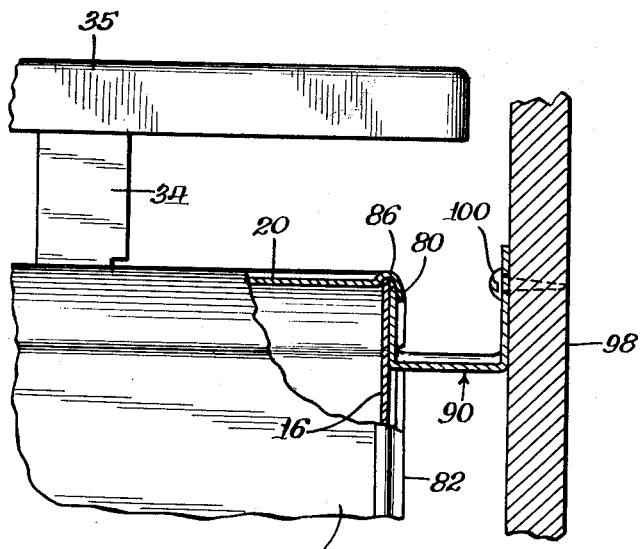
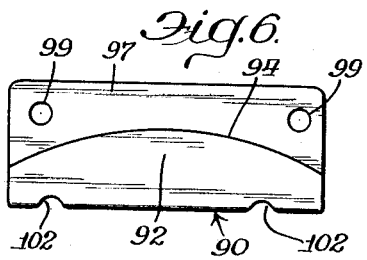
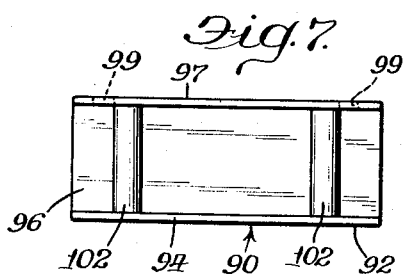
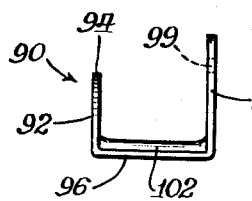
INVENTOR.
Harold O. Friedrich
BY
Stone, Nierman, Burmeister & Zummer
Attys.

United States Patent Office 3,193,031
Patented July 6, 1965

3,193,031
WEIGHING SCALE
Harold O. Friedrich, Lake Geneva, Wis., assignor to American Family Scale Company, Inc., Chicago, Ill., a corporation of Illinois
Filed Feb. 20, 1963, Ser. No. 259,840
2 Claims. (Cl. 177—166)

The present invention relates to weighing scales and more particularly to scales of the type which have provisions for indicating on a dial face both the net and the cumulative gross weight of a number of objects being weighed additively.

It is an object of the invention to provide a simply constructed weighing scale which accurately and efficiently provides a direct indication of the net and gross weights of objects being weighed.

It is a further object of the invention to provide a weighing scale on which there is a scale pointer and a net weight indicating pointer which are normally coupled together for joint rotation, and in which the coupling may be readily overcome to allow the net weight pointer to be momentarily rotated independently of the scale pointer.

It is a further object of the invention to provide a scale which may rest on a horizontal surface and which may be wall mounted in a simple manner with no changes necessary in the scale construction.

To effect these and other objects the present invention utilizes construction much simpler and more efficient than that of the prior art in which many intricate and complex mechanisms have been used to provide net and gross weight indicating scales. In the present invention, the net weight pointer is coupled to the scale pointer through a spring biased coupling which normally allows the pointers to rotate jointly. The net weight pointer has connected thereto a manually depressible knob which overcomes the coupling as long as the knob remains depressed. During this uncoupled period, the net weight pointer may be moved to any position desired. With the net weight pointer set at a desired position, the knob is released and the coupling is automatically re-effected for joint rotation of the pointers.

The invention has particular application where one or more ingredients are to be added to a container in measured weight quantities such as in mixing cooking recipes. First, a mixing container is set on the scale pan and weighed. The gross weight pointer or scale pointer rotates with the net weight pointer and moves angularly to a tare weight indication. The net weight pointer knob is then depressed and the net weight pointer is reset to zero on the dial. The first ingredient is then added to the container until the amount required is indicated by the direct reading of the net weight pointer. When a further ingredient is to be added, the net weight pointer is again reset to zero and the second ingredient is added until the required amount is indicated as having been added, by the direct reading of the net weight pointer. The scale pointer or gross weight pointer at this time will indicate the gross weight of the container and the two ingredients which have been added and the net weight indicator will indicate the net weight of the last ingredient added. Thus, any number of batches of ingredients may be added to a container in any desired amount. The scale dial face will indicate both the net weight of the last ingredient added, and will show the gross weight of the entire mixture and its container. No memory is required in mixing the recipe, and a simple resetting of the net weight pointer before the addition of each ingredient is all that is required.

Further, the axial displacement necessary to reset the net weight pointer has no lasting effect on the gross weight pointer, since the gross weight pointer is returned by weight responsive mechanism to the correct gross weight at the conclusion of the manual setting. This manual displacement of the net weight pointer is effected along the pointer axis at right angles to the direction of action of the weighing mechanism and has but little temporary effect on the weighing mechanism and its output pointer and has no effect on the weighing mechanism and gross weight pointer lasting after removal of the manual depressive force.

Other objects, features and advantages of the invention will be apparent from the detailed description of a presently preferred embodiment thereof, read in connection with the accompanying drawings in which:

FIGURE 4 is a rear view in elevation of the scale of FIGURE 1 to which a mounting bracket has been added;

FIGURE 5 is a partial sectional view taken along line 5—5 of FIGURE 4;

FIGURE 6 is a front view in elevation of a mounting bracket shown in FIGURE 4;

FIGURE 7 is a top view in elevation of the bracket of FIGURE 6; and

FIGURE 8 is a side view in elevation of the bracket of FIGURES 6 and 7.

Figure 1:
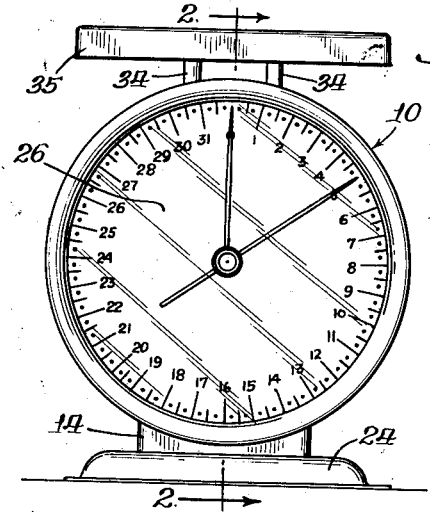
FIGURE 1 is a front view in elevation of a weighing scale utilizing the invention.

Now turning to the drawings in detail, there is shown the scale 10 which includes an outer appearance housing 12 enclosing the scale mechanism. This housing includes parallel sidewalls 14, vertical rear wall 16, rearwardly sloped front wall 18 and laterally arcuate top wall 20. The housing normally rests on a mounting base or pedestal 24 which is secured to the housing and which is designed to rest on a suitable horizontal surface such as a table or counter. At the front of the housing is the dial face 26 which is calibrated in suitable units for indicating to the users the weight of an object being weighed. The housing 12 may be made of sheet metal or other suitable rigid materials such as synthetic resinous plastics. Assuming sheet metal construction, the housing is joined to the mounting base by the use of extending ears fitted through suitable slots in the mounting base with the ears peened over tightly against the base. In describing the general construction of the scale obvious conventional details have been omitted to simplify the disclosure.

The housing 12 in its top surface 20 included two spaced apart slots 32 through which two supporting columns 34 extend. These columns bear a horizontal weighing pan or platform 35 spaced a distance above the housing top wall 20. The platform conventionally bears objects to be weighed. The columns 34 are constrained to vertical motion by the scale mechanism which comprises two sets of horizontally disposed pivot arms, numbered 36 for the lower arm set and 38 for the upper arm set. These arm sets are themselves individually pivoted at one end through respective pins 40 and 42 which traverse the housing structure for connection to the opposed vertical sidewalls and are substantially parallel to one another. These arm sets are in turn pinned adjacent their other or free end to both vertical columns 34 in a manner allowing relative rotation of each arm set about pins 40 and 42 and also allowing vertical motion of the columns. A coiled tension spring 44 is secured to the lower arm set 36 outwardly of the connection of the arm set to the columns 34. This spring is secured to a vertical rod 46 which extends through top surface 20 and is threaded at its upper end as indicated by the reference character 48. A knurled nut 50 rests on the top of top wall 20 and mates with this threaded end to adjust the tension of the spring by moving the rod and spring with respect to the top wall 20. This spring resists the downward pivoted motion of arm set 36 in a calibrated amount to provide the controlled indication of the scale.

Connected rigidly to the free end of the lower pivot arm set 36 is an arcuate rack 56. This rack is substantially vertical, is connected at its lower end to arm set 36 and in extent is positioned to extend freely upwardly behind the dial face 26. This rack meshes with a pinion gear 57 which is mounted within a bridge 58 which in turn is affixed to the inside front wall 18. The mounting of the gear within the bridge allows rotation of the pinion gear 57 on movement of the rack 56. Firmly affixed to this pinion gear is a bolt 59 which acts as an axial shaft which bolt extends through the dial face 26 and has permanently secured thereon a scale pointer 60. This pointer is, as mentioned, fixedly connected to the gear shaft 59 so that the pointer is rotated through an angular distance along the outside of the dial face in response to movement of the rack. Thus, when a weight is placed on platform 35, the supporting columns 34 move downwardly against the bias of spring 44 an amount limited by the tension of the spring. Downward movement of the columns also tends to pivot lower arm set 36 downwardly and as a result tends to draw rack 56 downwardly also. Downward movement of the rack rotates pinion gear 57 an angular amount equal to the linear travel of the rack and in turn rotates the scale pointer 60 an amount dependent on the downward movement of the platform occasioned by the weight of the object on the platform. With the pointer having been adjusted to the zero position at nut 50 prior to the start of a weighing operation, travel of the platform, its columns and the rack will cause deflection of the pointer an amount dependent on the weight to indicate the weight of the object as shown on the calibrated dial face.

Figure 3:
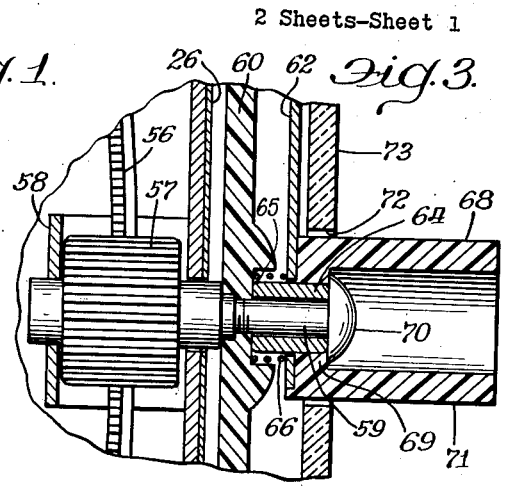
FIGURE 3 is a fragmentary sectional view of the central portion of the dial area of FIGURE 2 enlarged to show greater detail.
Figure 2:
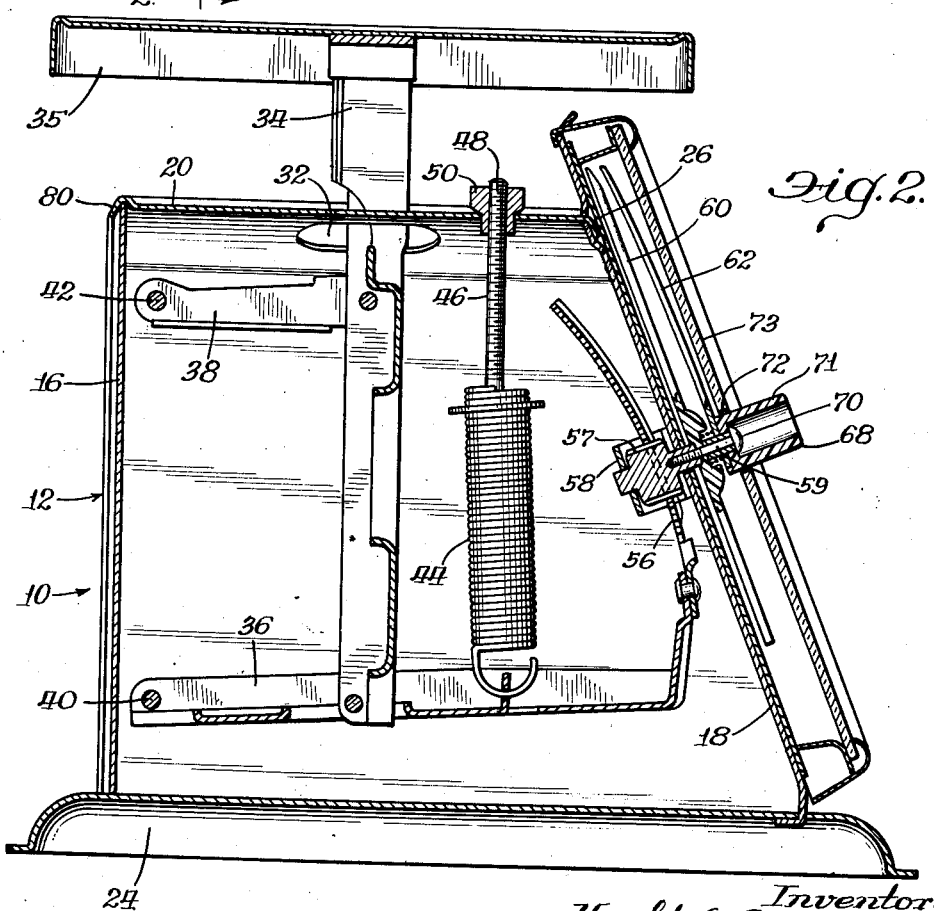
FIGURE 2 is a side sectional view taken along line 2—2 of FIGURE 1.

Connected to scale pointer 60 is a net weight pointer 62. The bolt 59, which has a head 70 on one end thereof, has a bushing 64 positioned between the head and the scale pointer 60. Slideably and rotatably mounted on bushing 64 is a knob 68. The knob 68 has a disc base 69 formed in one end thereof which is fractionally engageable with the head. The disc base rotatably and slideably engages the bushing 64 to be supported thereby. The knob includes a tubular wall 71 forming the outer surface of the knob and defining a recess within the knob head 70 of the bolt is positioned in the interior portion of the wall so that the knob may be moved axially relative to the bolt. The aforementioned net weight pointer 62 is fixed to the knob so that the pointer rotates with the knob. A compression spring 66 is positioned in a recess 65 of the scale pointer 60 and between pointer 60 and the net weight pointer 62 to hold the disc base 69 in resilient frictional engagement with head 70. The recess 65 is formed by an annular base 67 which holds the spring in position and acts as a stop for pointer 62. As may be clearly seen in FIGURE 3, the knob 68 is positioned in an aperture 72 of a protective glass plate 73.

It may be appreciated that as the pointer 62 is rotated, the knob 68, which has the net weight pointer 62 attached thereto, rotates along with pointer 62 by virtue of the frictional connection between the disc base 69 and head 70. In order to move pointer 62 relative to pointer 60, an axial force is applied to the knob to compress spring 66 and thereby disengage the disc base from head 70. The knob with pointer 62 may be rotated relative to the bushing 64. When the appropriate correction between pointer 62 and pointer 60 is achieved, the axial force from knob 68 is removed so that spring 66 forces disc base 69 into frictional engagement with head 70 thereby causing pointer 62 to rotate with pointer 60.

As mentioned previously, the apparatus is useful for indicating the gross weight of a mixture of ingredients in a container and also the net weight of an ingredient being added to the mix. Good examples of the use of the scale in this manner can be found in either the food preparation or drug fields. A container into which a prescribed weight of food is to be placed is first placed on the platform 35. The platform pivots arm set 36 downwardly about pivot pin 40 and the rack 56 moves downwardly an amount dependent on the weight of the container. Pinion gear 57 is rotated an angular distance by the rack movement resulting in rotation of the scale pointer and the net weight pointer. Consequently, knob 68 is depressed to overcome the pointer coupling and to allow the net weight pointer to be rotated independently of the scale pointer. The scale pointer remains at the indication of the container gross weight, and the net weight pointer is rotated back to the zero calibration on the dial face 26. The food is then placed in the container until the net weight pointer shows that the prescribed weight of food has been added to the container. At that time, the scale gross weight pointer 60 will have rotated further to indicate the gross weight of the container and the food. If more food is to be added, the net weight pointer 62 is again decoupled from the scale pointer by depression of knob 68 and the net weight pointer is returned to the zero position on the dial. The required amount of the second food batch is then added until the net weight indicator shows that the required weight of the second food batch has been added fully to the container.

It should be noted that the direction of the force utilized to decouple the pointers is axial to the gear shaft and perpendicular to the direction of motion engendered by the weight, i.e., downward travel of rack 56 and as a result depression of the knob will have no lasting effect on the gross weight indication.

Now turning to the construction characteristics which may be used to transform the scale from one adapted to rest on a table or countertop into one adapted for wall mounting, these features can best be seen in detail in FIGURES 4–8. In the figures, it can be seen that the side walls 14 and top wall 20 which may be integrally formed terminate at their rearmost end in an inturned flange. The top arcuate wall 20 has an arcuate flange 80 and the sidewalls have flange 82, the flanges combinedly forming the edges of a flat surface. These flanges tend to confine the flat rear wall 16 to complete the enclosure of the mechanism. The rear wall is held from rearward movement by these flanges and the curvature of a continuous ridge 86 which is formed in these walls just forward of the flanges. The continuous ridge extends parallel to the flanges and by the ridge curvature tends to keep the rear wall from forward movement. In this way, the flat rear wall 16 is held within the ridges 86, the ridges being so formed that the free ends of the flanges are spaced a short distance rearwardly of the rear wall 16 and virtually parallel thereto as seen best in FIGURE 5.

The spacing between the top wall flange 80 and the rear wall 16 is sufficient to snugly fit therebetween a mounting bracket 90 which is used to mount the scale to a vertical wall. The bracket shown in detail in FIGS. 6–8 has a front wall 92 which is vertical and terminates in an arcuate top surface 94 the curvature of which is complementary to the curvature of top wall 20 and which is designed to fit under flange 80. The bracket has a bottom surface which connects the front wall to the rear wall 97 which in turn abuts against the mounting surface of the adjacent room wall 98. The bracket rear wall 97 is parallel to the front wall of the bracket and has suitable holes 99 for receiving wall mounting screws 100 which are tightened into the room wall. The bracket floor 96 has suitable stiffening corrugations 102 made therein to more fully support the scale weight against the room wall. By use of this bracket fitted within the inherent structure of the scale appearance housing, the scale may be rested on a horizontal surface or mounted to a vertical wall with no change in the scale construction and merely the use of the bracket and screws. Further the bracket mounting may be used to store the scale on the wall mounting when not in use, the scale being lifted off the bracket for use on a horizontal surface as desired.

While there has been described what is at present thought to be a preferred embodiment of the invention it will be understood that it is intended to cover in the appended claims, all such modifications as fall within the true spirit and scope of the invention.

What is claimed is:

1. In a weighing scale, the combination comprising, a weighing pan, a weighing mechanism responsive to the weight of an object placed on the pan, a calibrated dial mounted exteriorly of said mechanism, a shaft connected to said mechanism and extending through said dial face, said shaft rotating responsively to weight placed on the weighing pan, a gross weight pointer attached to said shaft and rotatable therewith for traversing said dial face, a head connected to said shaft and being spaced from the pointer, a net weight pointer axially and angularly movable relative to said shaft mounted on the shaft between the gross weight pointer and the head, and a compression spring positioned between the gross weight pointer and the net weight pointer for holding the net weight pointer in frictional connection with the head to cause the net weight pointer to rotate with the shaft but being releasable from the shaft by moving the net weight pointer axially along the shaft toward the gross weight pointer to interrupt the frictional connection with the head.

2. A weighing scale of the type adapted to rest on a horizontal surface, said scale including a weighing pan horizontally disposed above an outer appearance housing, a rear wall being a portion of said housing, a top wall being a portion of said housing, said top wall extending rearwardly past the rear wall, a downturned flange extending from said top wall spaced outwardly toward said rear wall and parallel thereto, means for mounting said scale in an operative manner on a vertical wall comprising a bracket, said bracket including an upturned wall fitted between said flange and said rear wall and a second wall spaced from and connected to said upturned wall, means in said second wall for fixing said bracket to a vertical wall to support said scale on said bracket and said vertical wall in a manner allowing said scale to be lifted off said bracket and disassociated therefrom, a weighing mechanism responsive to the weight of an object place on the pan mounted in said housing, a calibrated dial mounted exteriorly of said housing, a shaft connected to said mechanism and extending through said dial face, said shaft rotating responsively to weight placed on the weighing pan, a gross weight pointer attached to said shaft and rotatable therewith for traversing said dial face, a hand connected to said shaft and being spaced from the pointer, a net weight pointer axially and angularly movable relative to said shaft mounted on the shaft between the gross weight pointer and the head, and a compression spring positioned between the gross weight pointer and the net weight pointer for holding the net weight pointer in frictional connection with the head to cause the net weight pointer to rotate with the shaft but being releasable from the shaft by moving the net weight pointer axially along the shaft toward the gross weight pointer to interrupt the frictional connection with the head.

References Cited by the Examiner

UNITED STATES PATENTS

| | | | |
|---|---|---|---|
| 437,379 | 9/90 | Gaston | 177—244 |
| 1,210,204 | 12/16 | Reeves | 177—166 |
| 1,360,154 | 11/20 | Thomas | 177—166 |
| 1,407,987 | 2/22 | Crane | 177—166 |
| 1,594,391 | 8/26 | Veeder | 235—91 |
| 1,689,976 | 10/28 | Stimpson | 177—244 |
| 2,836,977 | 6/58 | Cook | 177—166 X |

LEO SMILOW, *Primary Examiner.*

LEYLAND M. MARTIN, *Examiner.*